US007317683B2

(12) United States Patent
Goetzinger et al.

(10) Patent No.: US 7,317,683 B2
(45) Date of Patent: Jan. 8, 2008

(54) WEIGHTED FAIR QUEUE SERVING PLURAL OUTPUT PORTS

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 10/015,994

(22) Filed: Nov. 1, 2001

(65) Prior Publication Data

US 2003/0081549 A1    May 1, 2003

(51) Int. Cl.
*H04J 1/16* (2006.01)
(52) U.S. Cl. .................... 370/230.1; 235/395.4
(58) Field of Classification Search ........... 370/230.1, 370/235, 395.2, 395.4, 395.41, 395.42, 395.43, 370/412, 417, 418, 414, 415, 416, 501; 345/501
See application file for complete search history.

(56) References Cited

U.S. PATENT DOCUMENTS

| 4,621,359 | A | * | 11/1986 | McMillen ................. 370/235 |
|---|---|---|---|---|
| 5,249,184 | A | | 9/1993 | Woest et al. .............. 370/85.8 |
| 5,490,141 | A | | 2/1996 | Lai et al. .................. 370/60.1 |
| 5,548,590 | A | | 8/1996 | Grant et al. .................. 370/61 |
| 5,650,993 | A | * | 7/1997 | Lakshman et al. .......... 370/236 |
| 5,742,772 | A | | 4/1998 | Sreenan |
| 5,790,545 | A | | 8/1998 | Holt et al. |
| 5,831,971 | A | | 11/1998 | Bonomi et al. ............. 370/230 |
| 5,835,494 | A | | 11/1998 | Hughes et al. |
| 5,844,890 | A | | 12/1998 | Delp et al. ................. 370/230 |
| 5,850,399 | A | | 12/1998 | Ganmukhi et al. ......... 370/412 |
| 5,905,730 | A | | 5/1999 | Yang et al. |
| 5,926,459 | A | | 7/1999 | Lyles et al. ................ 370/230 |
| 5,926,481 | A | | 7/1999 | Wang et al. ............... 370/465 |
| 5,946,297 | A | | 8/1999 | Calvignac et al. .......... 370/230 |
| 5,999,963 | A | | 12/1999 | Bruno et al. ............... 709/104 |
| 6,014,367 | A | | 1/2000 | Joffe ........................ 370/230 |
| 6,018,527 | A | | 1/2000 | Yin et al. .................. 370/412 |
| 6,028,842 | A | | 2/2000 | Chapman et al. |

(Continued)

FOREIGN PATENT DOCUMENTS

EP        0859492        8/1998

(Continued)

OTHER PUBLICATIONS

U.S. Appl. No. 10/102,343, filed Mar. 20, 2002, "Network Processor Having Fast Flow Queue Disable Process".

(Continued)

*Primary Examiner*—Chi Pham
*Assistant Examiner*—Alexander O. Boakye
(74) *Attorney, Agent, or Firm*—Dugan & Dugan, P.C

(57) ABSTRACT

A data communication apparatus includes a plurality of output ports and a scheduler for assigning priorities for outbound data frames. The scheduler includes one or more scheduling queues. Each scheduling queue indicates an order in which data flows are to be serviced. At least one scheduling queue has a respective plurality of output ports assigned to the scheduling queue. That is, the scheduling queue is shared by two or more output ports.

20 Claims, 7 Drawing Sheets

U.S. PATENT DOCUMENTS

| | | | |
|---|---|---|---|
| 6,028,843 A | 2/2000 | Delp et al. .................. 370/235 |
| 6,031,822 A | 2/2000 | Wallmeier ................. 370/235 |
| 6,038,217 A | 3/2000 | Lyles ........................ 370/233 |
| 6,041,059 A | 3/2000 | Joffe et al. .................. 370/412 |
| 6,052,751 A | 4/2000 | Runaldue et al. |
| 6,064,650 A | 5/2000 | Kappler et al. |
| 6,064,677 A | 5/2000 | Kappler et al. |
| 6,067,301 A * | 5/2000 | Aatresh ...................... 370/418 |
| 6,072,772 A | 6/2000 | Charny et al. |
| 6,072,800 A | 6/2000 | Lee ............................ 370/412 |
| 6,078,953 A | 6/2000 | Vaid et al. ................... 709/223 |
| 6,081,507 A | 6/2000 | Chao et al. .................. 370/235 |
| 6,092,115 A | 7/2000 | Choudhury et al. ......... 709/235 |
| 6,094,435 A | 7/2000 | Hoffman et al. |
| 6,101,193 A | 8/2000 | Ohba |
| 6,104,700 A | 8/2000 | Haddock et al. ............. 370/235 |
| 6,108,307 A | 8/2000 | McConnell et al. ......... 370/235 |
| 6,122,673 A | 9/2000 | Basak et al. ................. 709/238 |
| 6,144,669 A | 11/2000 | Williams et al. ............ 370/401 |
| 6,157,614 A | 12/2000 | Pasternak et al. ........... 370/236 |
| 6,157,649 A | 12/2000 | Peirce et al. ................. 370/401 |
| 6,157,654 A | 12/2000 | Davis .......................... 370/412 |
| 6,160,812 A | 12/2000 | Bauman et al. |
| 6,169,740 B1 | 1/2001 | Morris et al. |
| 6,188,698 B1 | 2/2001 | Galand et al. ............... 370/412 |
| 6,226,267 B1 | 5/2001 | Spinney et al. .............. 370/235 |
| 6,229,812 B1 | 5/2001 | Parruck et al. ............... 370/412 |
| 6,229,813 B1 | 5/2001 | Buchko et al. ............... 370/412 |
| 6,236,647 B1 | 5/2001 | Amalfitano .................. 370/335 |
| 6,246,692 B1 * | 6/2001 | Dai et al. ..................... 370/438 |
| 6,259,699 B1 | 7/2001 | Opalka et al. |
| 6,266,702 B1 | 7/2001 | Darnell et al. |
| 6,356,546 B1 * | 3/2002 | Beshai ......................... 370/358 |
| 6,389,019 B1 | 5/2002 | Fan et al. |
| 6,389,031 B1 | 5/2002 | Chao et al. |
| 6,404,768 B1 * | 6/2002 | Basak et al. ................. 370/395.7 |
| 6,469,982 B1 | 10/2002 | Henrion et al. |
| 6,481,251 B1 | 11/2002 | Meier et al. |
| 6,563,829 B1 | 5/2003 | Lyles et al. |
| 6,608,625 B1 * | 8/2003 | Chin et al. ................... 345/501 |
| 6,611,522 B1 | 8/2003 | Zheng et al. |
| 6,646,986 B1 | 11/2003 | Beshai |
| 6,721,325 B1 | 4/2004 | Duckering et al. |
| 6,775,287 B1 * | 8/2004 | Fukano et al. ............ 370/395.1 |
| 6,804,249 B1 | 10/2004 | Bass et al. |
| 6,810,012 B1 | 10/2004 | Yin et al. |
| 6,810,043 B1 | 10/2004 | Naven et al. |
| 6,810,426 B2 | 10/2004 | Mysore et al. |
| 6,813,274 B1 * | 11/2004 | Suzuki et al. ................ 370/412 |
| 6,832,261 B1 | 12/2004 | Westbrook et al. |
| 6,850,490 B1 * | 2/2005 | Woo et al. .................... 370/230 |
| 6,885,664 B2 * | 4/2005 | Ofek et al. ................... 370/372 |
| 6,888,830 B1 | 5/2005 | Snyder II et al. |
| 6,891,835 B2 * | 5/2005 | Kalkunte et al. ....... 370/395.41 |
| 6,975,638 B1 * | 12/2005 | Chen et al. ................... 370/412 |
| 7,020,137 B2 | 3/2006 | Kadambi et al. |
| 2001/0004363 A1 * | 6/2001 | Usukura ...................... 370/417 |
| 2001/0012294 A1 | 8/2001 | Kadambi et al. |
| 2002/0003795 A1 | 1/2002 | Oskouy et al. |
| 2002/0023168 A1 | 2/2002 | Bass et al. |
| 2002/0024830 A1 | 2/2002 | Yoneda |
| 2002/0136230 A1 | 9/2002 | Dell et al. |
| 2002/0163922 A1 | 11/2002 | Dooley et al. |
| 2002/0181455 A1 * | 12/2002 | Norman et al. .............. 370/389 |
| 2003/0050954 A1 | 3/2003 | Tayyar et al. |
| 2003/0058879 A1 | 3/2003 | Rumph |

FOREIGN PATENT DOCUMENTS

| | | |
|---|---|---|
| EP | 0 957 602 A2 | 11/1999 |
| EP | 0989770 | 3/2000 |
| EP | 1049352 | 11/2000 |
| EP | 1 061 763 A2 | 12/2000 |
| JP | 04-094240 | 3/1992 |
| JP | 183886 | 6/2000 |
| JP | 295247 | 10/2000 |
| JP | 0007822 | 12/2000 |
| WO | 9935792 | 7/1999 |
| WO | 99/53647 | 10/1999 |
| WO | 99/53648 | 10/1999 |
| WO | 0120876 | 3/2001 |

OTHER PUBLICATIONS

Abstract of Publication entitled "Design of packet-fair queueing schedulers using a RAM-based searching engine" by HJ Chao et al, IEEE Journal on Selected Areas in Communications, vol. 17, No. 6, pp. 1105-1126, Jun. 1999.

U.S. Appl. No. 10/102,166, filed Mar. 20, 2002 entitled "Method and Apparatus for Improving the Fairness of New Attaches to a Weighted Fair Queue in a Quality of Service (QoS) Scheduler".

Lyons et al., "Estimating Clock Speeds for the ATMSWITCH Architecture", Proc. NETWORKS '99 (The Third New Zealand ATM and Broadband Workshop), Jan. 21-22, 1999, pp. 39-53.

* cited by examiner

WEIGHTED FAIR QUEUE SERVING PLURAL OUTPUT PORTS

CROSS REFERENCE TO RELATED PATENT APPLICATIONS

The present application is related to the following U.S. Patent Applications, each of which is hereby incorporated by reference herein in its entirety:

U.S. patent application Ser. No. 10/016,518, filed Nov. 1, 2001, titled "WEIGHTED FAIR QUEUE HAVING EXTENDED EFFECTIVE RANGE";

U.S. patent application Ser. No. 10/015,760, filed Nov. 1, 2001, titled "WEIGHTED FAIR QUEUE HAVING ADJUSTABLE SCALING FACTOR";

U.S. patent application Ser. No. 10/002,085, filed Nov. 1, 2001, titled "EMPTY INDICATORS FOR WEIGHTED FAIR QUEUES";

U.S. patent application Ser. No. 10/004,217, filed Nov. 1, 2001, titled "QoS SCHEDULER AND METHOD FOR IMPLEMENTING PEAK SERVICE DISTANCE USING NEXT PEAK SERVICE TIME VIOLATED INDICATION" now U.S. Pat. No. 6,973,036 issued on Dec. 6, 2005;

U.S. patent application Ser. No. 10/002,416, filed Nov. 1, 2001, titled "QoS SCHEDULER AND METHOD FOR IMPLEMENTING QUALITY OF SERVICE WITH AGING STAMPS" now U.S. Pat. No. 7,103,051 issued Sep. 5, 2006;

U.S. patent application Ser. No. 10/004,440, filed Nov. 1, 2001, titled "QoS SCHEDULER AND METHOD FOR IMPLEMENTING QUALITY OF SERVICE WITH CACHED STATUS ARRAY" now U.S. Pat. No. 7,046,676 issued on May 16, 2006; and U.S. patent application Ser. No. 10/004,217, filed Nov. 1, 2001, titled "QoS SCHEDULER AND METHOD FOR IMPLEMENTING QUALITY OF SERVICE ANTICIPATING THE END OF A CHAIN OF FLOWS" now U.S. Pat. No. 6,982,986 issued on Jan. 3, 2006.

FIELD OF THE INVENTION

The present invention is concerned with data and storage communication systems and is more particularly concerned with a scheduler component of a network processor.

BACKGROUND OF THE INVENTION

Data and storage communication networks are in widespread use. In many data and storage communication networks, data packet switching is employed to route data packets or frames from point to point between source and destination, and network processors are employed to handle transmission of data into and out of data switches.

FIG. 1 is a block diagram illustration of a conventional network processor in which the present invention may be applied. The network processor, which is generally indicated by reference numeral 10, may be constituted by a number of components mounted on a card or "blade". Within a data communication network, a considerable number of blades containing network processors may be interposed between a data switch and a data network.

The network processor 10 includes data flow chips 12 and 14. The first data flow chip 12 is connected to a data switch 15 (shown in phantom) via first switch ports 16, and is connected to a data network 17 (shown in phantom) via first network ports 18. The first data flow chip 12 is positioned on the ingress side of the switch 15 and handles data frames that are inbound to the switch 15.

The second data flow chip 14 is connected to the switch 15 via second switch ports 20 and is connected to the data network 17 via second network ports 22. The second data flow chip 14 is positioned on the egress side of the switch 15 and handles data frames that are outbound from the switch 15.

As shown in FIG. 1, a first data buffer 24 is coupled to the first data flow chip 12. The first data buffer 24 stores inbound data frames pending transmission of the inbound data frames to the switch 15. A second data buffer 26 is coupled to the second data flow chip 14, and stores outbound data frames pending transmission of the outbound data frames to the data network 17.

The network processor 10 also includes a first processor chip 28 coupled to the first data flow chip 12. The first processor chip 28 supervises operation of the first data flow chip 12 and may include multiple processors. A second processor chip 30 is coupled to the second data flow chip 14, supervises operation of the second data flow chip 14 and may include multiple processors.

A control signal path 32 couples an output terminal of second data flow chip 14 to an input terminal of first data flow chip 12 (e.g., to allow transmission of data frames therebetween).

The network processor 10 further includes a first scheduler chip 34 coupled to the first data flow chip 12. The first scheduler chip 34 manages the sequence in which inbound data frames are transmitted to the switch 15 via first switch ports 16. A first memory 36 such as a fast SRAM is coupled to the first scheduler chip 34 (e.g., for storing data frame pointers and flow control information as described further below). The first memory 36 may be, for example, a QDR (quad data rate) SRAM.

A second scheduler chip 38 is coupled to the second data flow chip 14. The second scheduler chip 38 manages the sequence in which data frames are output from the second network ports 22 of the second data flow chip 14. Coupled to the second scheduler chip 38 are at least one and possibly two memories (e.g., fast SRAMs 40) for storing data frame pointers and flow control information. The memories 40 may, like the first memory 36, be QDRs. The additional memory 40 on the egress side of the network processor 10 may be needed because of a larger number of flows output through the second network ports 22 than through the first switch ports 16.

FIG. 2 schematically illustrates conventional queuing arrangements that may be provided for a data flow chip/scheduler pair (either the first data flow chip 12 and the first scheduler chip 34 or the second data flow chip 14 and the second scheduler chip 38) of the network processor 10 of FIG. 1. In the particular example illustrated in FIG. 2, the first data flow chip 12 and the first scheduler chip 34 are illustrated, but a very similar queuing arrangement may be provided in connection with the second data flow chip 14 and the second scheduler chip 38. In the queuing arrangement for the first data flow chip 12 and the first scheduler chip 34, incoming data frames (from data network 17) are buffered in the input data buffer 24 associated with the first data flow chip 12 (FIG. 1). Each data frame is associated with a data flow or "flow". As is familiar to those who are skilled in the art, a "flow" represents a one-way connection between a source and a destination.

Flows with which the incoming data frames are associated are enqueued in a scheduling queue 42 maintained in the first scheduler chip 34. The scheduling queue 42 defines a sequence in which the flows enqueued therein are to be serviced. The particular scheduling queue 42 of interest in connection with the present invention is a weighted fair queue which arbitrates among flows entitled to a "best effort" or "available bandwidth" Quality of Service (QoS).

As shown in FIG. 2, the scheduling queue 42 is associated with a respective output port 44 of the first data flow chip 12. It is to be understood that the output port 44 is one of the first switch ports 16 illustrated in FIG. 1. (However, if the data flow chip/scheduler pair under discussion were the egress side data flow chip 14 and scheduler chip 38, then the output port 44 would be one of the network ports 22.) Although only one scheduling queue 42 and one corresponding output port 44 are shown, it should be understood that in fact there may be plural output ports and corresponding scheduling queues each assigned to a respective port.

Although not indicated in FIG. 2, the first scheduler chip 34 also includes flow scheduling calendars which define output schedules for flows which are entitled to a scheduled QoS with guaranteed bandwidth, thus enjoying higher priority than the flows governed by the scheduling queue 42.

The memory 36 associated with the first scheduler chip 34 holds pointers ("frame pointers") to locations in the first data buffer 24 corresponding to data frames associated with the flows enqueued in the scheduling queue 42. The memory 36 also stores flow control information, such as information indicative of the QoS to which flows are entitled.

When the scheduling queue 42 indicates that a particular flow enqueued therein is the next to be serviced, reference is made to the frame pointer in the memory 36 corresponding to the first pending data frame for the flow in question and the corresponding frame data is transferred from the first data buffer 24 to an output queue 46 associated with the output port 44.

A more detailed representation of the scheduling queue 42 is shown in FIG. 3. As noted above, the scheduling queue 42 is used for weighted fair queuing of flows serviced on a "best effort" basis. In a particular example of a scheduling queue as illustrated in FIG. 3, the scheduling queue 42 has 512 slots (each slot represented by reference numeral 48). Other numbers of slots may be employed. In accordance with conventional practice, flows are enqueued or attached to the scheduling queue 42 based on a formula that takes into account both a length of a data frame associated with a flow to be enqueued and a weight which corresponds to a QoS to which the flow is entitled.

More specifically, the queue slot in which a flow is placed upon enqueuing is calculated according to the formula CP+((WF×FS)/SF), where CP is a pointer ("current pointer") that indicates a current position (the slot currently being serviced) in the scheduling queue 42; WF is a weighting factor associated with the flow to be enqueued, the weighting factor having been determined on the basis of the QoS to which the flow is entitled; FS is the size of the current frame associated with the flow to be enqueued; and SF is a scaling factor chosen to scale the product (WF×FS) so that the resulting quotient falls within the range defined by the scheduling queue 42. (In accordance with conventional practice, the scaling factor SF is conveniently defined as a integral power of 2—i.e., SF=$2^n$, with n being a positive integer—so that scaling the product (WF×FS) is performed by right shifting.) With this known weighted fair queuing technique, the weighting factors assigned to the various flows in accordance with the QoS assigned to each flow govern how close to the current pointer of the queue each flow is enqueued. In addition, flows which exhibit larger frame sizes are enqueued farther from the current pointer of the queue, to prevent such flows from appropriating an undue proportion of the available bandwidth of the queue. Upon enqueuement, data that identifies a flow (the "Flow ID") is stored in the appropriate queue slot 48.

In some applications, there may be a wide range of data frame sizes associated with the flows, perhaps on the order of about 64 bytes to 64 KB, or three orders of magnitude. It may also be desirable to assign a large range of weighting factors to the flows so that bandwidth can be sold with a great deal of flexibility and precision. Consequently, it is desirable that the scheduling queue in which weighted fair queuing is applied have a large range, where the range of the scheduling queue is defined to be the maximum distance that an incoming flow may be placed from the current pointer. As is understood by those who are skilled in the art, the scheduling queue 42 functions as a ring, with the last queue slot (number 511 in the present example) wrapping around to be adjacent to the first queue slot (number 0).

It could be contemplated to increase the range of the scheduling queue by increasing the number of slots. However, this has disadvantages in terms of increased area required on the chip, greater manufacturing cost and power consumption, and increased queue searching time. Accordingly, there is a trade-off between the range of the scheduling queues and the resources consumed in providing the physical array required for the scheduling queue. This trade-off becomes particularly acute as the number of output ports (switch ports 16 and/or network ports 22 in FIG. 1) to be serviced is increased. Conventional practice calls for each output port to be serviced by a respective dedicated scheduling queue. Consequently, as the number of output ports is increased, either the physical array space provided for the corresponding scheduling queues must be increased, with corresponding increase in consumption of resources, or the size of each scheduling queue must be reduced, thereby reducing the range and effectiveness of the weighted fair queuing to be provided by the scheduling queues.

It would accordingly be desirable to increase the number of output ports to be serviced by scheduling queues without decreasing the effectiveness of the scheduling queues or increasing the resources consumed by physical array space for the scheduling queues.

SUMMARY OF THE INVENTION

According to an aspect of the invention, a data communication apparatus is provided. The apparatus includes a plurality of output ports and a scheduler for assigning priorities to outbound data frames. The scheduler includes one or more scheduling queues, with each scheduling queue indicating an order in which data flows are to be serviced. At least one scheduling queue has a respective plurality of the output ports assigned to the scheduling queue. For example, a respective two of the output ports may be assigned to one scheduling queue. Alternatively, a respective four of the output ports may be assigned to one scheduling queue. In one embodiment of the invention, the plurality of output ports may include 256 output ports and the scheduler may have 64 scheduling queues to which the 256 output ports are assigned. In general, any number of output ports may be assigned to a scheduling queue.

Another aspect of the invention provides a method of enqueuing flows in a scheduler for a network processor. The method includes receiving a first data frame corresponding to a first flow appointed for transmission from a first output port, and enqueuing the first flow to a first scheduling queue associated with the first output port. The method further includes receiving a second data frame corresponding to a second flow appointed for transmission from a second output port, and enqueuing the second flow to the first scheduling queue, with the first scheduling queue also being associated with the second output port.

The method according to this aspect of the invention may further include receiving a third data frame corresponding to a third flow appointed for transmission from a third output port, and enqueuing the third flow to the first scheduling queue, with the first scheduling queue also being associated with the third output port. The method may further include receiving a fourth data frame corresponding to a fourth flow appointed for transmission from a fourth output port, and enqueuing the fourth flow to the first scheduling queue, with the first scheduling queue also being associated with the fourth output port. In general, any number of output ports may be employed.

According to still another aspect of the invention, a method of transmitting data frames from a network processor is provided. The method includes dequeuing a first flow from a first scheduling queue, and transmitting from a first output port a data frame associated with the dequeued first flow. The method further includes dequeuing a second flow from the first scheduling queue, and transmitting from a second output port a data frame associated with the dequeued second flow, where the second output port is different from the first output port.

The method may further include dequeuing a third flow from the first scheduling queue, and transmitting from a third output port a data frame associated with the dequeued third flow, with the third output port being different from the first and second output ports. The method may further include dequeuing a fourth flow from the first scheduling queue, and transmitting from a fourth output port a data frame associated with the dequeued fourth flow, with the fourth output port being different from the first, second and third output ports. In general, any number of output ports may be employed.

According to still a further aspect of the invention, a method of operating a data communication apparatus includes providing a scheduling queue in a scheduler for a network processor, and assigning a plurality of output ports to the scheduling queue.

By sharing each scheduling queue among a plurality of output ports, an increased number of output ports can be serviced, without compromising the effectiveness of the scheduling queues and without devoting additional resources (e.g., chip area) to the physical arrays provided for the scheduling queues.

Other objects, features and advantages of the present invention will become more fully apparent from the following detailed description of exemplary embodiments, the appended claims and the accompanying drawings.

DETAILED DESCRIPTION

Figure 1:
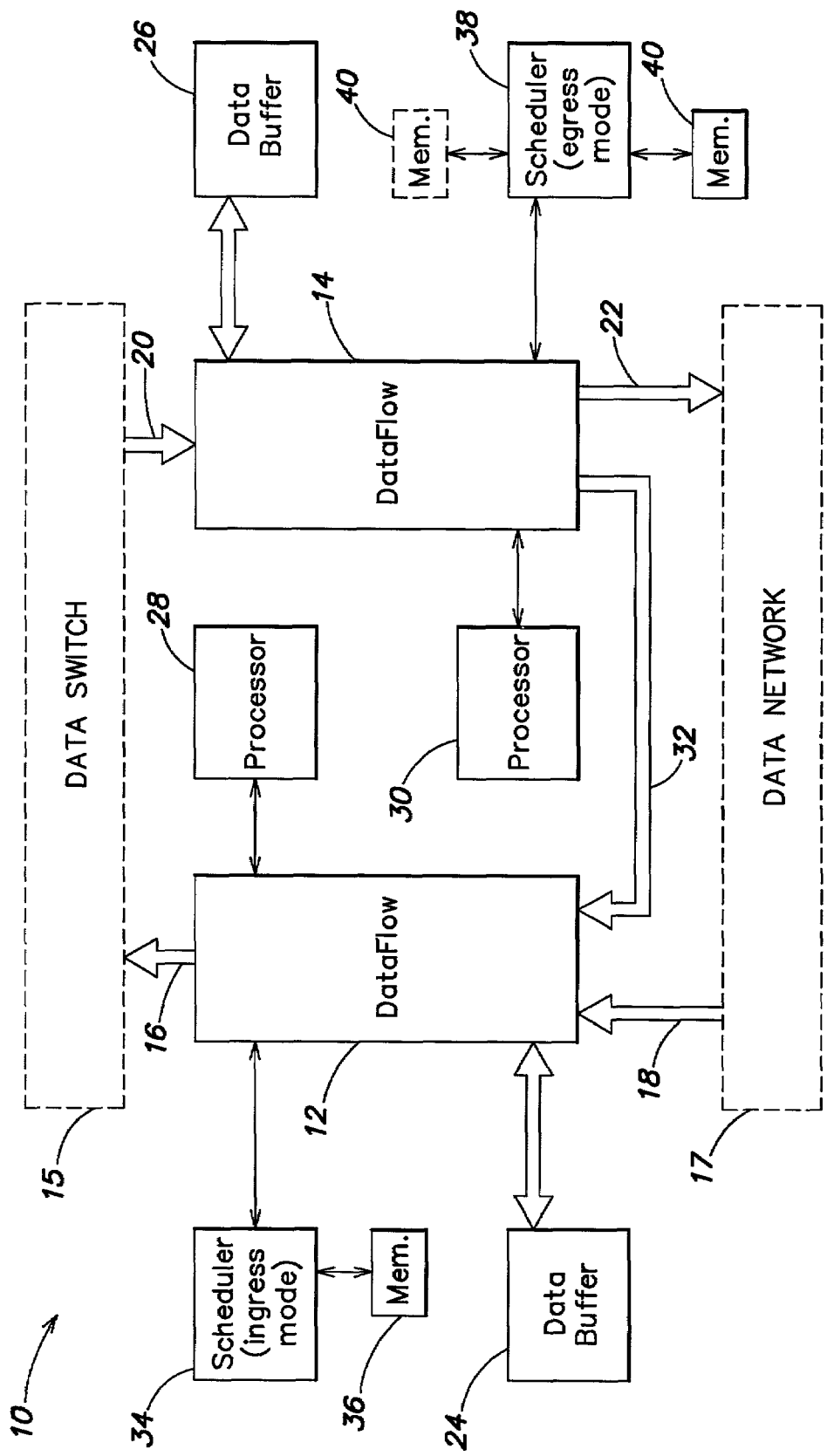
FIG. 1 is a block diagram of a conventional network processor in which the present invention may be applied.

Referring again to FIG. 1, in one embodiment the number of first switch ports 16 (output ports) of the first data flow chip 12 may be 256, corresponding to 256 "blades" (network processors) installed in conjunction with the switch 15. Further in accordance with an exemplary embodiment of the invention, the number of weighted fair queuing scheduling queues 42 (FIGS. 2 and 3) included in the first scheduler 34 to service the 256 output ports may be 64. In such an embodiment and in accordance with the invention, each first scheduling queue 42 is shared by four output ports (e.g., four of the first switch ports 16).

By contrast, the number of the second network ports 22 of the second data flow chip 14, serving as output ports for the second data flow chip 14, may be 64. The second scheduler chip 38 may be identical to the first scheduler chip 34, having 64 scheduling queues to service the 64 output ports (second network ports 22) of the second data flow chip 14. Consequently, in the pair of the second data flow chip 14 and the second scheduler 38, a conventional one-to-one relationship may prevail between the output ports and the scheduling queues of the second scheduler 38. Other relationships between number of output ports and number of scheduling queues for the first data flow chip 12/scheduler 34 and/or for the second data flow chip 14/scheduler 38 are envisioned such as those described further below.

Figure 4:
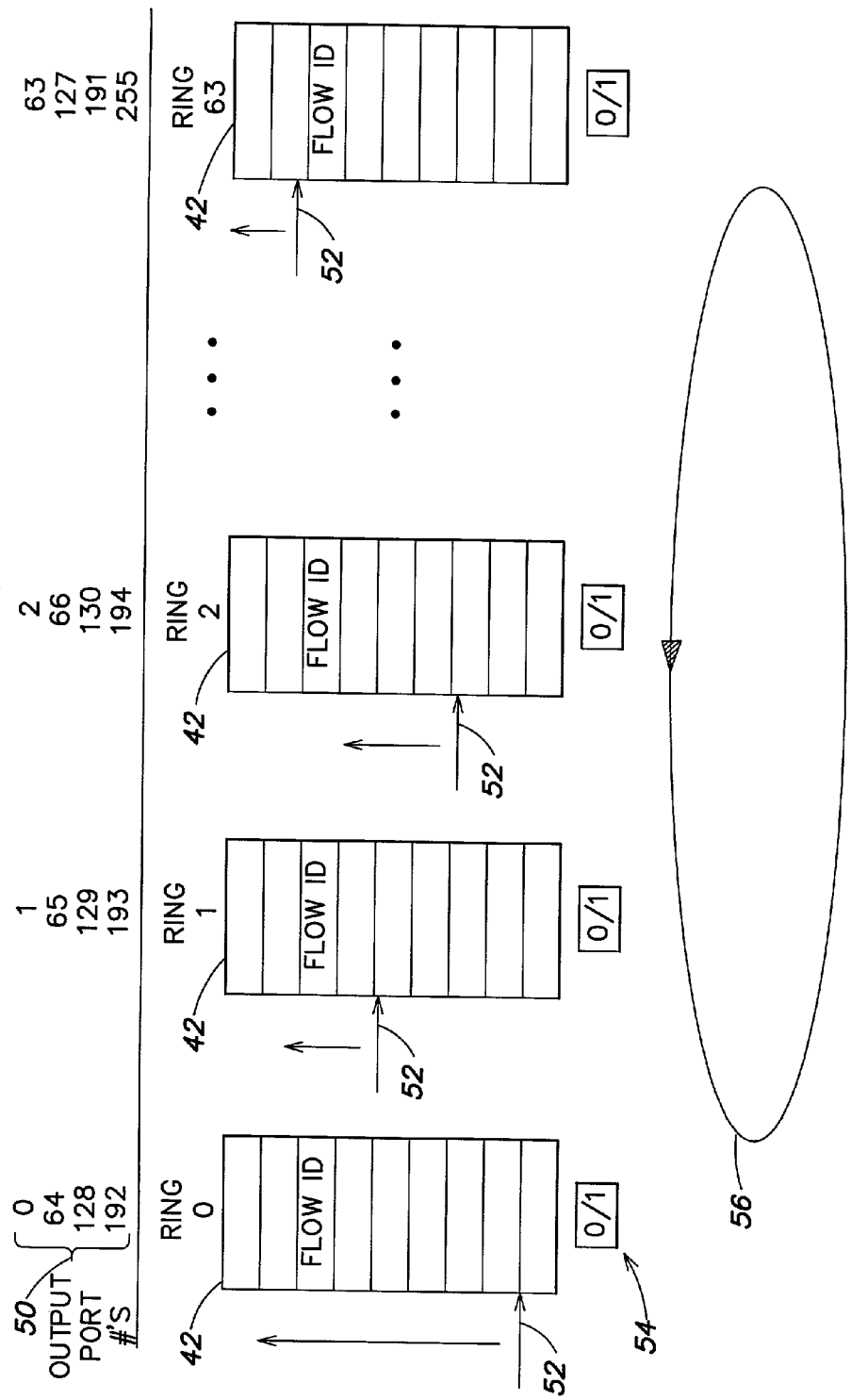
FIG. 4 is a pictorial representation of scheduling queues maintained in the scheduler of FIG. 2, and showing assignment of plural output ports to each scheduling queue in accordance with the present invention.

FIG. 4 pictorially illustrates the 64 scheduling queues 42 (also referred to as "RING 0-RING 63" in FIG. 4) of the first scheduler 34 of FIG. 1.

As indicated at 50 in FIG. 4, in at least one embodiment of the invention, output ports (first switch ports 16 in FIG. 1) of the first data flow chip 12 are assigned to scheduling queues 42 of the first scheduler 34 according to the six least significant bits of the number which identifies the respective output port. Thus, as illustrated, output ports 0, 64, 128 and 192 are assigned to scheduling queue 0 (RING 0); output ports 1, 65, 129 and 193 are assigned to scheduling queue 1 (RING 1); output ports 2, 66, 130 and 194 are assigned to scheduling queue 2 (RING 2), and so forth, with output ports 63, 127, 191 and 255 assigned to scheduling queue 63 (RING 63). As used herein, "assignment" of an output port to a scheduling queue means that flows appointed for transmission from the particular output port are enqueued to the scheduling queue to which the output port is assigned. Thus among the flows enqueued to any one of the scheduling queues are flows respectively appointed to be transmitted from plural output ports upon dequeuing of the flows from the scheduling queue.

FIG. 4 also illustrates a number of other features of the inventive scheduling queues 42, including the use of a conventional current pointers 52. With respect to each scheduling queue 42, the current pointer 52 indicates the slot most recently serviced or currently being serviced for the respective scheduling queue. Also shown at 54 in FIG. 4 are indicators that indicate whether the respective scheduling queues are empty. In at least one embodiment, the indicators 54 are provided in accordance with an invention disclosed in copending patent application Ser. No. 10/002,085, filed Nov. 1, 2001. The entire disclosure of this copending patent application is incorporated herein by reference. Other indication schemes may be used to indicate whether each scheduling queue 42 is empty. It is also indicated at 56 in FIG. 4 that a round robin process may search each of the 64 scheduling queues 42 in turn. Other search processes may be employed.

Figure 5:
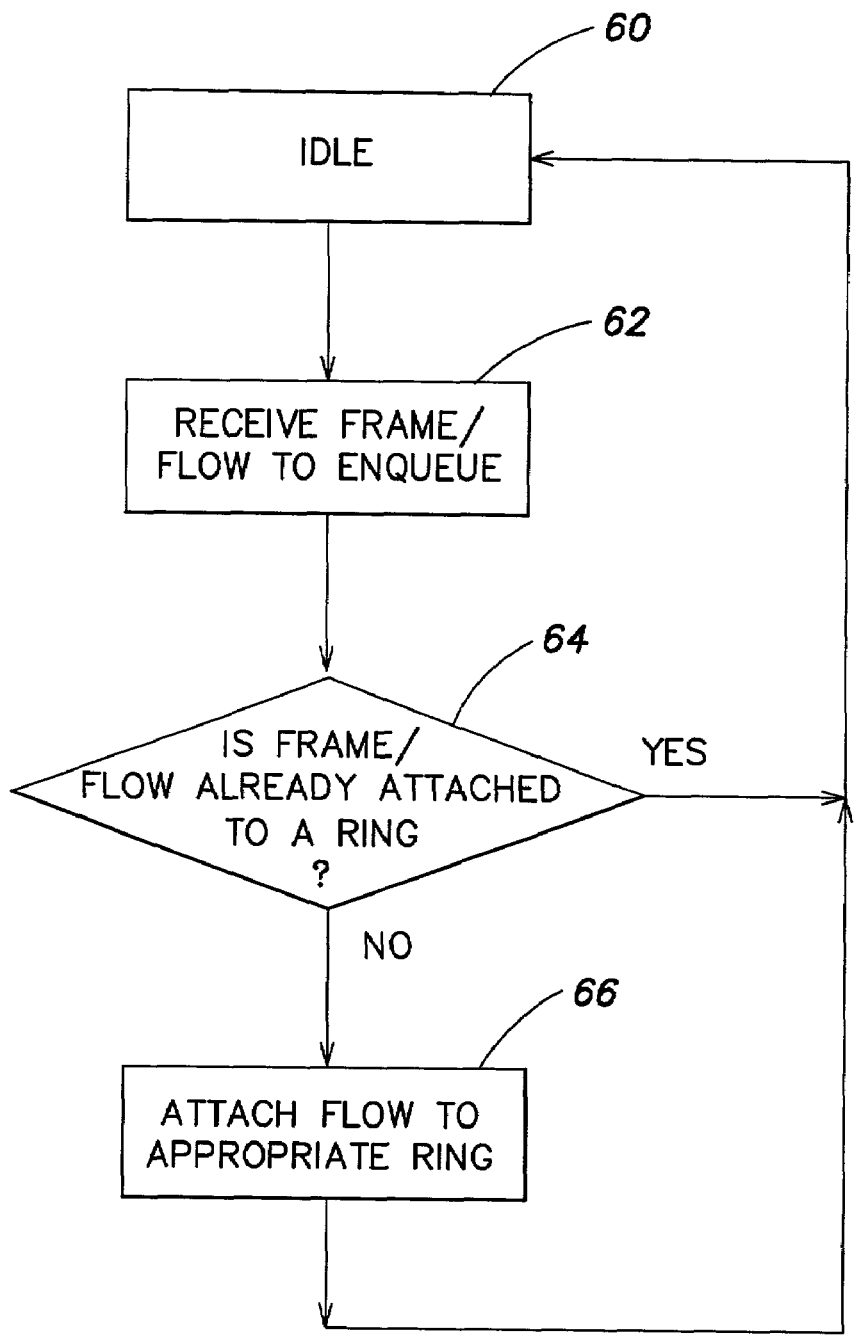
FIG. 5 is a flow chart that illustrates a process for enqueuing flows in accordance with the present invention.

FIG. 5 is a flow chart that illustrates a procedure by which data frames and flows may be enqueued in accordance with the invention. With reference to FIG. 5, the procedure of FIG. 5 idles (block 60) until it is time to enqueue an incoming data frame and/or flow (block 62). Next it is determined, at block 64, whether the flow with which the incoming data frame is associated has already been attached to one of the scheduling queues 42 (e.g., RINGS 1-63 in FIG. 4). If the flow has already been attached to a scheduling queue, then the procedure of FIG. 5 returns to an idle condition (block 60). (It will be understood that in this case, in accordance with conventional practice, the incoming data frame is added to the scheduling queue to which the flow associated with the data frame is attached (e.g., the flow queue for the corresponding flow which is maintained in the memory 36 (FIG. 2) associated with the first scheduler 34.))

If the flow associated with the incoming data frame has not been attached to one of the scheduling queues 42, then block 66 follows block 64. At block 66 the corresponding flow is attached to one of the 64 scheduling queues 42 (e.g., one of RINGS 0-63 of FIG. 4). The specific scheduling queue is selected based on the number of the output port from which the flow is to be transmitted. In particular, the number of the scheduling queue to which the flow is to be attached may be indicated by the six least significant bits of the number of the output port for the flow as previously described with reference to FIG. 4. Other methods may be employed to identify a scheduling queue to which to attach the flow. The attachment of the flow to the indicated scheduling queue proceeds in accordance with the conventional formula CP+((WF×FS)/SF), except that the weighting factor WF may be based in part on a relative bandwidth accorded to the output port in question. Recall that CP refers to the current pointer of the respective scheduling queue 42, FS refers to the size of the current frame associated with the flow to be enqueued and SF is a scaling factor.

Figure 6:
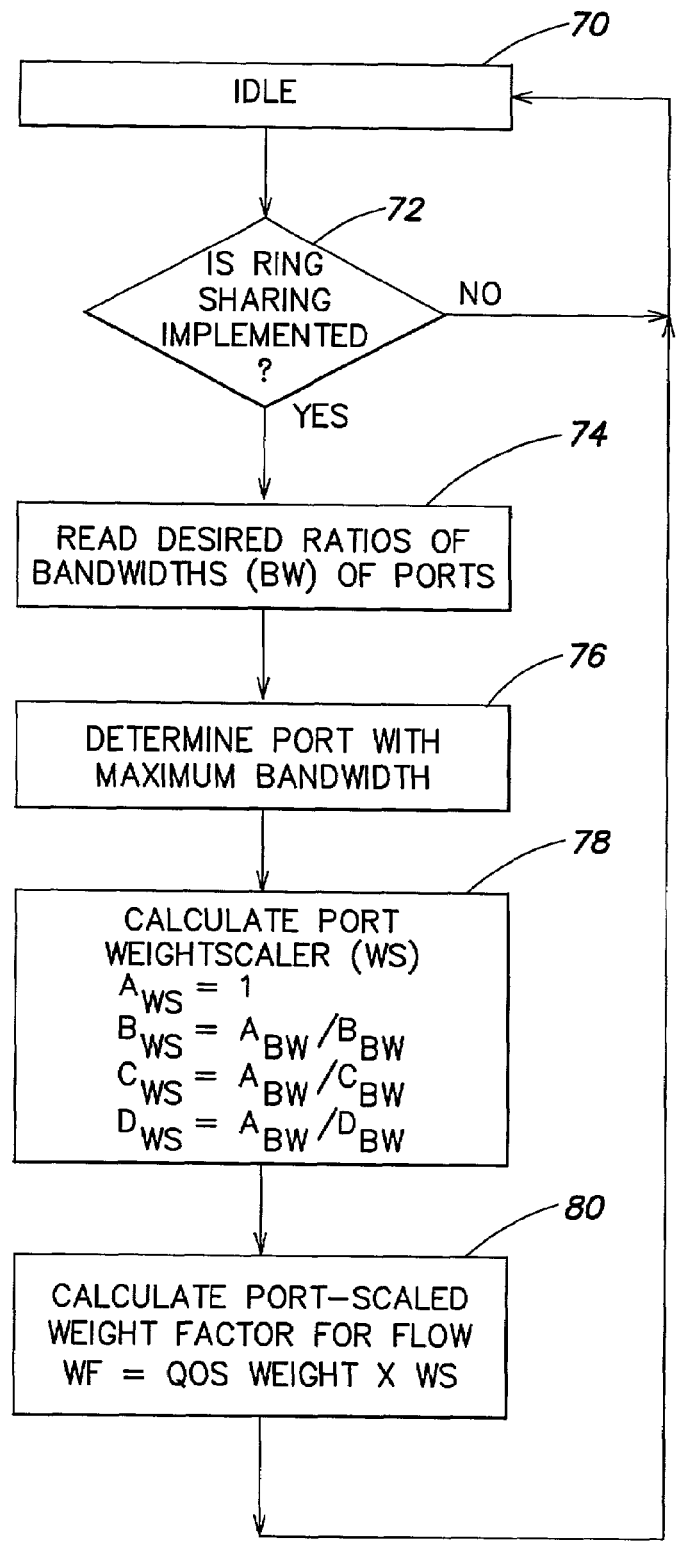
FIG. 6 is a flow chart that illustrates a process for determining a weighting factor for a flow in accordance with the present invention.

Calculation of a suitable weighting factor WF based on relative output port bandwidth in accordance with the invention is illustrated in FIG. 6. Thus FIG. 6 is a flow chart that illustrates a procedure by which a weighting factor WF for weighted fair queuing is calculated in accordance with the invention. The procedure of FIG. 6 idles (block 70) until it is determined whether the scheduling queues 42 in question (one or more of RINGS 0-63 in FIG. 4) are to be shared by more than one output port (block 72). If such is not the case, then the procedure of FIG. 6 returns to an idle condition (block 70). If sharing of a particular scheduling queue 42 by plural output ports is implemented, then block 74 follows block 72. At block 74 the ratios of the bandwidths respectively assigned to the output ports sharing the scheduling queue 42 are determined. Then, at block 76, the output port sharing the scheduling queue 42 which has the maximum bandwidth assigned to it is identified. It will be assumed for present purposes that the output port with the maximum bandwidth is referred to as port A, and that four output ports are assigned to share the scheduling queue 42 (although other numbers of output ports may share the scheduling queue 42). On the basis of the respective bandwidths of the four output ports, respective weight scalers (WS) are calculated for each of the four output ports, designated ports A, B, C and D (block 78). The weight scaler WS assigned to port A is assigned the value "1"; the weight scaler WS assigned to port B is equal to the bandwidth assigned to port A ($A_{BW}$) divided by the bandwidth assigned to port B ($B_{BW}$); the weight scaler WS assigned to port C is equal to the bandwidth assigned to port A ($A_{BW}$) divided by the bandwidth assigned to port C ($C_{BW}$); the weight scaler WS assigned to port D is equal to the bandwidth assigned to port A ($A_{BW}$) divided by the bandwidth assigned to port D ($D_{BW}$). Other weight scaler assignments may be employed.

Figure 2:
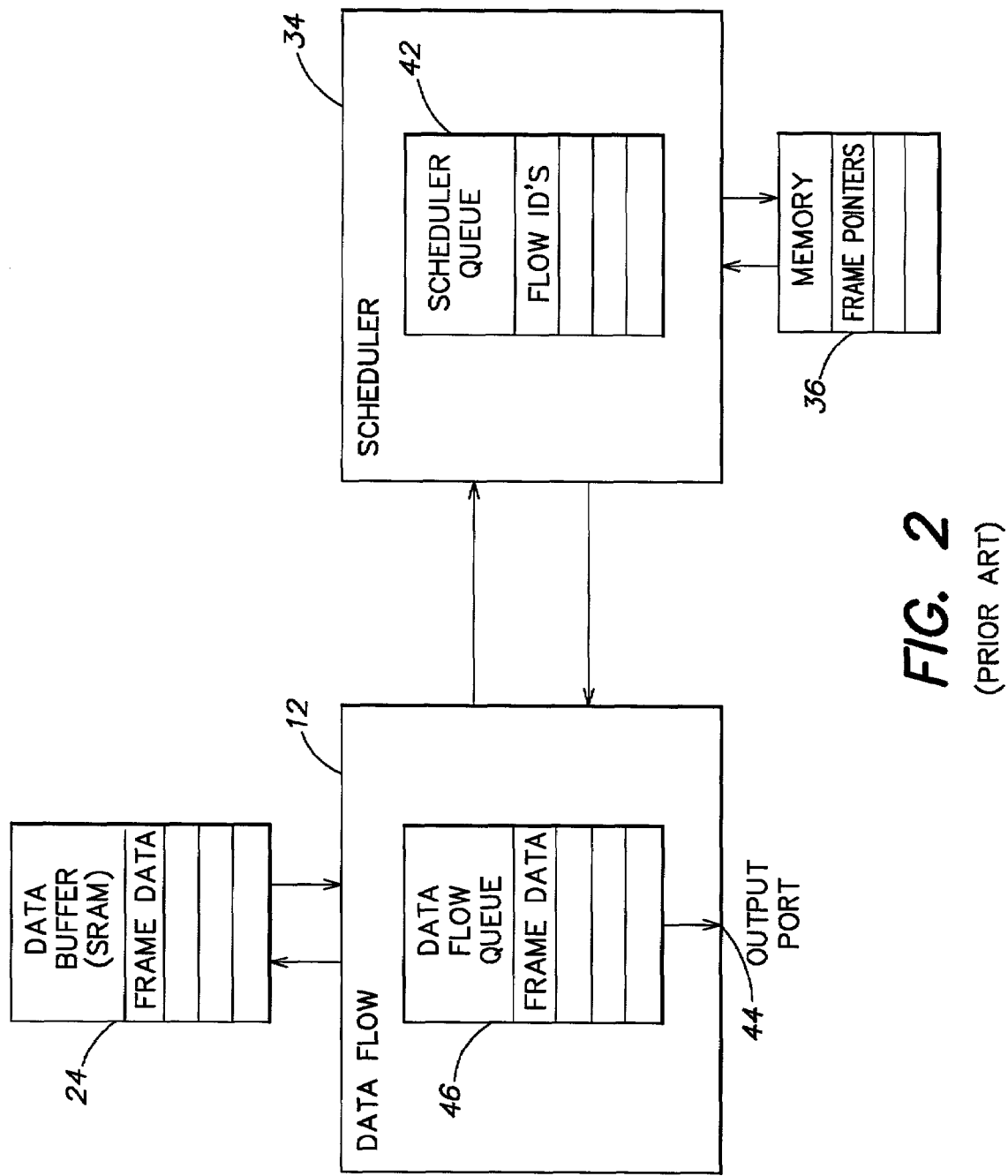
FIG. 2 is a block diagram representation of conventional queuing arrangements provided in a data flow chip/scheduler pair included in the network processor of FIG. 1.
Figure 3:
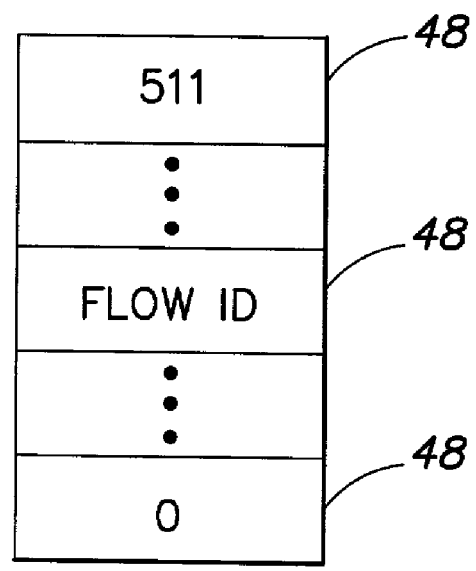
FIG. 3 is a pictorial representation of a weighted fair queuing scheduling queue provided in accordance with conventional practices.

Next, at block 80, the weighting factor WF for a particular flow is calculated as the product of the weight assigned to the flow according to the Quality of Service (QoS) for that flow ("QoS weight factor") and the weight scaler WS for the output port from which the flow is to be transmitted. The QoS weight factor for a flow may be stored, for example, in the memory 36 (FIG. 2). It will observed that larger weight scalers are assigned to output ports having lower bandwidths. Consequently, flows to be output from those output ports are proportionately enqueued farther from the current pointer, and thus receive a lower proportion of the available bandwidth.

Figure 7:
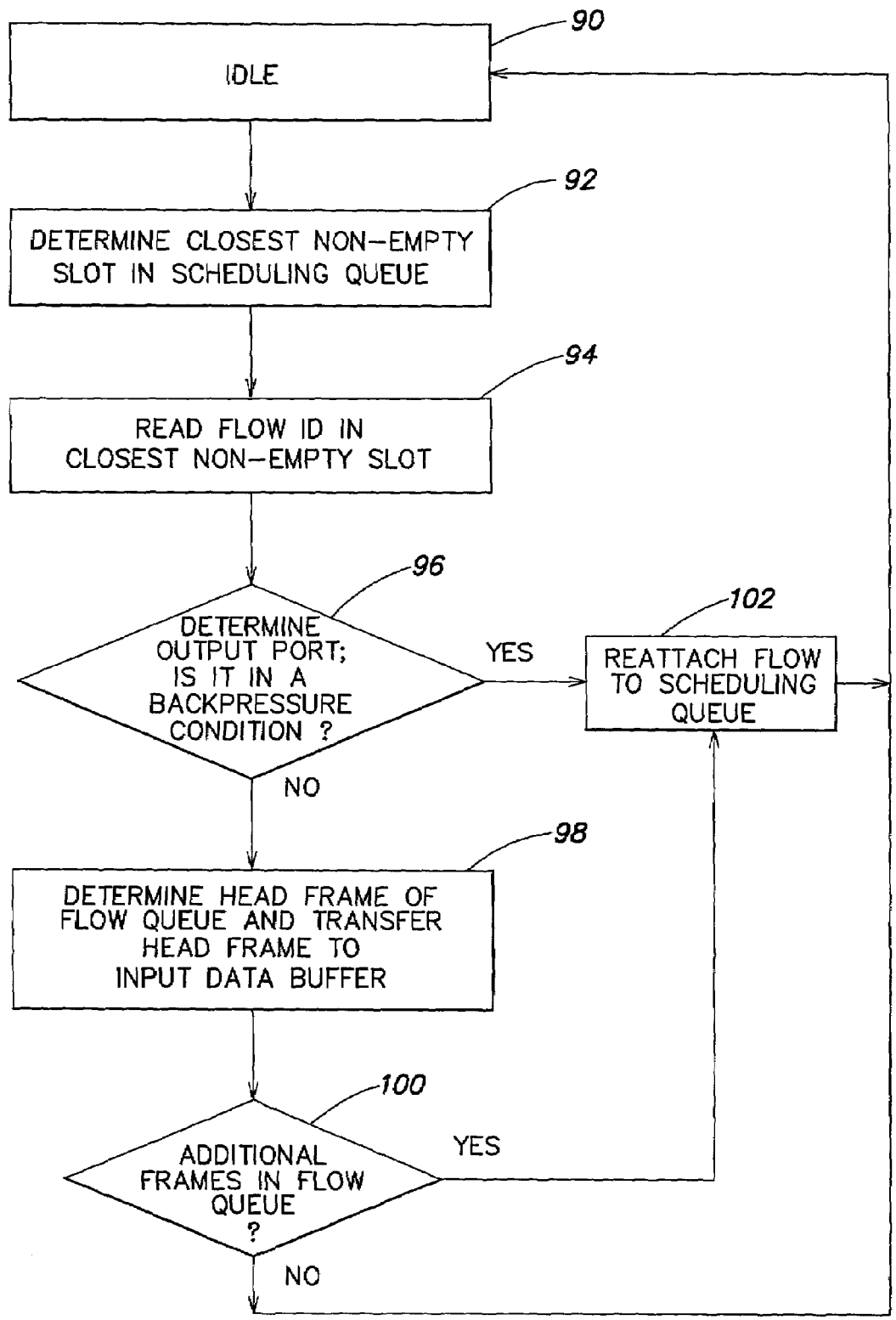
FIG. 7 is a flow chart that illustrates a process for dequeuing flows in accordance with the present invention.

FIG. 7 is a flow chart that illustrates a process by which a flow may be dequeued from a scheduling queue in accordance with the present invention. Initially, the process of FIG. 7 idles (block 90) until it is determined that it is time to dequeue a flow from the scheduling queue 42 (FIG. 4) in question. Then, at block 92, the closest non-empty slot 48 (FIG. 3) in the scheduling queue 42 to the current pointer is determined; and, at block 94, the flow ID in the closest non-empty slot 48 is read. Following block 94 is decision block 96. At decision block 96 the output port from which the flow is to be transmitted is determined, and it is further determined whether that output port is in a backpressure condition. (The concept of port backpressure is well known to those who are skilled in the art and need not be described herein.) In general, however, an output port backpressure condition refers to a condition in which the output/dataflow queue 46 (FIG. 2) corresponding to an output port is full (e.g., cannot accept additional frames).

If the output port is not in a backpressure condition then block 98 follows decision block 96. At block 98 the flow queue corresponding to the flow and maintained in memory 36 (FIG. 2) is referenced, and the head frame in the flow queue is determined. The head frame is then transferred from the input data buffer 24 (FIGS. 1 and 2) to the output queue 46 (FIG. 2) which corresponds to the output port in question. It will be understood that, in due course, the data frame is then transmitted from the output port.

Referring once more to FIG. 7, decision block 100 follows block 98. At decision block 100, it is determined, in accordance with conventional practice, whether there are additional frames in the flow queue (memory 36, FIG. 2) besides the head frame that was just dispatched for transmission. If so, block 102 follows. At block 102 the flow is reattached to the scheduling queue 42 according to the conventional formula CP+((WF×FS)/SF). As is customary, the frame size FS is the size of the current data frame in the flow queue. Following reattachment of the flow to the scheduling queue 42 at block 102, the procedure of FIG. 7 returns to an idle condition (block 90).

Considering again decision block 100, if it is found that the data frame just dispatched for transmission was the last frame in the flow queue (memory 36 in FIG. 2), then the procedure of FIG. 7 returns to an idle condition (block 90) without reattaching the flow to the scheduling queue.

Considering again decision block 96, if it is determined at decision block 96 that the output port is in a backpressure condition, then block 102 directly follows block 96. That is, the flow is reattached to the scheduling queue 42 at a distance from its current slot 48, without dispatching a data frame of the flow for transmission via the output port. In the case of reattachment of the flow without dispatching a data frame in response to output port backpressure, the reattachment may be based on the conventional formula using weighting factor and frame size. Alternatively, the reattachment may be based on a multiple of the conventional formula or may be at a maximum distance from the current pointer, to minimize the number of times the flow is accessed in the scheduling queue 42 until the backpressure condition is cleared.

The processes of FIGS. 5-7 may be implemented in hardware, software or a combination thereof. In at least one embodiment of the invention, the processes of FIGS. 5-7 are implemented in hardware employing a suitable combination of conventional logic circuitry such as adders, comparators, selectors, etc. Such hardware may be located, for example, within the scheduler 34 and/or the scheduler 38 (FIG. 1). A person of ordinary skill in the art may develop logic circuitry capable of performing the inventive processes described with reference to FIGS. 5-7. In a software embodiment of the invention, the processes of FIGS. 5-7 may comprise one or more computer program products. Each inventive computer program product may be carried by a medium readable by a computer (e.g., a carrier wave signal, a floppy disk, a hard drive, a random access memory, etc.).

With sharing of scheduling queues among two or more output ports per scheduling queue, the resources devoted to maintaining scheduling queues are used efficiently, and a larger number of output ports may be served for a given number of scheduling queues.

The foregoing description discloses only exemplary embodiments of the invention; modifications of the above disclosed apparatus and methods which fall within the scope of the invention will be readily apparent to those of ordinary skill in the art. For example, sharing of each scheduling queue among four output ports is illustrated hereinabove, but other numbers of output ports assigned to each scheduling queue, such as two, three or five or more, are also contemplated. The term output ports as used in the specification and claims is inclusive of the noted switch or network ports, or for that matter ports of devices associated with output channels associated with output flows.

Furthermore, in the above-described exemplary embodiments, assignment of output ports to scheduling queues is made on a fixed basis in accordance with numbers assigned to the output ports and the scheduling queues. However, it is also contemplated that the assignment of output ports to scheduling queues may be variable, and may be indicated by data stored in a programable register (not shown) or other storage location which stores data indicating assignments of output ports to scheduling queues.

Although the number of scheduling queues maintained in the scheduler 34 is indicated as being 64 in the examples given above, it is, of course, contemplated to include a larger or smaller number of scheduling queues in the scheduler 34. Also, although scheduling queues are shown as being part of a scheduler that is implemented as a separate chip, the scheduling queues may also be maintained as part of a scheduler that is integrated with a data flow chip or with a processor chip.

Still further, it is contemplated to implement the present invention in connection with scheduling queues having extended ranges. Such scheduling queues may include subqueues having different respective ranges and resolutions, as disclosed in copending patent application Ser. No. 10/016,518, filed Nov. 11, 2001. This co-pending patent application is incorporated herein by reference.

Accordingly, while the present invention has been disclosed in connection with exemplary embodiments thereof, it should be understood that other embodiments may fall within the spirit and scope of the invention, as defined by the following claims.

The invention claimed is:

1. A data communication apparatus, comprising:
    a plurality of output ports; and
    a scheduler adapted to assign priorities to outbound data frames associated with data flows, the scheduler including one or more scheduling queues, each scheduling queue adapted to indicate an order in which data flows are to be serviced, at least one scheduling queue having at least two of the output ports assigned to the scheduling queue;
    wherein a relative bandwidth of one of the output ports is used to assign one of the data flows to one of the scheduling queues.

2. The data communication apparatus of claim 1, wherein the one or more scheduling queues are used for weighted fair queuing.

3. The data communication apparatus of claim 1, wherein the data frames are of varying sizes.

4. The data communication apparatus of claim 1, wherein two additional output ports are assigned to one scheduling queue.

5. The data communication apparatus of claim 4, wherein the plurality of output ports includes 256 output ports, and the scheduler has 64 scheduling queues to which the 256 output ports are assigned.

6. The data communication apparatus of claim 1, wherein the scheduler includes a first integrated circuit and the output ports are included in a second integrated circuit coupled to the first integrated circuit.

7. A method of enqueuing flows in a scheduler for a network processor, comprising:
    receiving a first data frame corresponding to a first flow appointed for transmission from a first output port;
    enqueuing the first flow to a first scheduling queue associated with the first output port;
    receiving a second data frame corresponding to a second flow appointed for transmission from a second output port; and
    enqueuing the second flow to the first scheduling queue, the first scheduling queue also being associated with the second output port;
    wherein the first scheduling queue is used for weighted fair queuing based in part on a relative bandwidth of the output port from which the respective flow is appointed for transmission.

8. The method of claim 7, further comprising:
    receiving a third data frame corresponding to a third flow appointed for transmission from a third output port;
    enqueuing the third flow to the first scheduling queue, the first scheduling queue also being associated with the third output port;
    receiving a fourth data frame corresponding to a fourth flow appointed for transmission from a fourth output port; and enqueuing the fourth flow to the first scheduling queue, the first scheduling queue also being associated with the fourth output port.

9. The method of claim 7, wherein each enqueuing step includes attaching the respective flow to the first scheduling queue according to the formula OP+((WF×FS)/SF, wherein OP is a current pointer value associated with the respective flow; WF is a weighting factor associated with the respective flow; FS is a frame size associated with the respective flow; and SF is a scaling factor.

10. The method of claim 9, wherein the weighting factor WF is based in part on a weight scaler WS associated with the output port from which the respective flow is appointed for transmission.

11. A method of transmitting data frames from a network processor, comprising:
dequeuing a first flow from a first scheduling queue;
transmitting from a first output port a data frame associated with the dequeued first flow;
dequeuing a second flow from the first scheduling queue; and
transmitting from a second output port a data frame associated with the dequeued second flow, the second output port being different from the first output port;
wherein the first scheduling queue is used for weighted fair queuing based in part on a relative bandwidth of the output port from which the respective flow is appointed for transmission.

12. The method of claim 11, further comprising:
dequeuing a third flow from the first scheduling queue;
transmitting from a third output port a data frame associated with the dequeued third flow, the third output port being different from the first and second output ports;
dequeuing a fourth flow from the first scheduling queue; and
transmitting from a fourth output port a data frame associated with the dequeued fourth flow, the fourth output port being different from the first, second and third output ports.

13. A method of operating a data communication apparatus, comprising:
providing a scheduling queue in a scheduler for a network processor; and
assigning at least two output ports to the scheduling queue;
wherein the scheduling queue is used for weighted fair queuing based in part on a relative bandwidth of the output port from which the respective flow is appointed for transmission.

14. The method of claim 13, wherein the scheduling queue is one of a plurality of scheduling queues provided in the scheduler, and each of the scheduling queues has a respective plurality of output ports assigned thereto.

15. The method of claim 13, wherein two additional output ports are assigned to the scheduling queue.

16. A data communication apparatus, comprising:
a plurality of output ports; and
a scheduler having at least one scheduling queue, the scheduler adapted to:
  receive a first data frame corresponding to a first flow appointed for transmission from a first of the output ports;
  enqueue the first flow to a first scheduling queue associated with the first of the output ports;
  receive a second data frame corresponding to a second flow appointed for transmission from a second of the output ports; and
  enqueue the second flow to the first scheduling queue, the first scheduling queue also being associated with the second of the output ports;
wherein the first scheduling queue is used for weighted fair queuing based in part on a relative bandwidth of the output port from which the respective flow is appointed for transmission.

17. A data communication apparatus, comprising:
a plurality of output ports; and
a scheduler having at least one scheduling queue, the scheduler adapted to:
dequeue a first flow from a first scheduling queue;
transmit from a first of the output ports a data frame associated with the dequeued first flow;
dequeue a second flow from the first scheduling queue; and
transmit from a second of the output ports a data frame associated with the dequeued second flow, the second output port being different from the first output port;
wherein the first scheduling queue is used for weighted fair queuing based in part on a relative bandwidth of the output port from which the respective flow is appointed for transmission.

18. A computer readable medium for enqueuing flows in a scheduler for a network processor, comprising: a medium readable by a computer, the computer readable medium having computer program code adapted to: receive a first data frame corresponding to a first flow appointed for transmission from a first output port; enqueue the first flow to a first scheduling queue associated with the first output port; receive a second data frame corresponding to a second flow appointed for transmission from a second output port; and enqueue the second flow to the first scheduling queue, the first scheduling queue also being associated with the second output port; wherein the first scheduling queue is used for weighted fair queuing based in part on a relative bandwidth of the output port from which the respective flow is appointed for transmission.

19. A computer readable medium for transmitting data frames from a network processor, comprising: a medium readable by a computer, the computer readable medium having computer program code adapted to: dequeue a first flow from a first scheduling queue; transmit from a first output port a data frame associated with the dequeued first flow; dequeue a second flow from the first scheduling queue; and transmit from a second output port a data frame associated with the dequeued second flow, the second output port being different from the first output port; wherein the first scheduling queue is used for weighted fair queuing based in part on a relative bandwidth of the output port from which the respective flow is appointed for transmission.

20. A computer readable medium for operating a data communication apparatus that includes a scheduler having one or more scheduling queues, the computer readable medium comprising: a medium readable by a computer, the computer readable medium having computer program code adapted to assign a plurality of output ports to a first of the one or more scheduling queues; wherein the first scheduling queue is used for weighted fair queuing based in part on a relative bandwidth of the output port from which the respective flow is appointed for transmission.

* * * * *